United States Patent
Granshaw et al.

(10) Patent No.: US 9,244,813 B2
(45) Date of Patent: Jan. 26, 2016

(54) SOFTWARE TRACING USING EXTENSIBLE MARKUP LANGUAGE MESSAGES

(71) Applicant: INTERNATIONAL BUSINESS MACHINES CORPORATION, Armonk, NY (US)

(72) Inventors: David Granshaw, Eastleigh (GB); Samuel T. Massey, Hursley (GB); Daniel J. McGinnes, Southampton (GB); Martin A. Ross, Gosport (GB); Richard G. Schofield, Eastleigh (GB); Craig H. Stirling, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/592,389

(22) Filed: Jan. 8, 2015

(65) Prior Publication Data
US 2015/0212925 A1    Jul. 30, 2015

(30) Foreign Application Priority Data
Jan. 29, 2014 (GB) .................................. 1401511.9

(51) Int. Cl.
G06F 9/44    (2006.01)
G06F 11/36    (2006.01)
G06F 9/54    (2006.01)

(52) U.S. Cl.
CPC ............ *G06F 11/3636* (2013.01); *G06F 9/546* (2013.01)

(58) Field of Classification Search
CPC .......................... G06F 11/3636; G06F 11/3466
USPC ......................................................... 717/128
See application file for complete search history.

(56) References Cited

U.S. PATENT DOCUMENTS

| 6,718,516 B1 | 4/2004 | Claussen et al. |
| 6,907,564 B1 | 6/2005 | Burchhardt et al. |
| 7,013,306 B1 | 3/2006 | Turba et al. |

(Continued)

FOREIGN PATENT DOCUMENTS

| FR | 2892211 | 4/2007 |
| FR | 2892211 A1 * | 4/2007 |

OTHER PUBLICATIONS

Baresi et al., Towards Dynamic Monitoring of WS-BPEL Processes, Springer-Berlag Berlin Heidelberg (2005), retrieved from http://link.springer.com/chapter/10.1007%2F11596141_21 on Apr. 19, 2015.*
Fauvet et al., Collecting and Querying Distributed Traces of Composite Service Executions, (2002), Applicant Provided Prior Art.*

(Continued)

*Primary Examiner* — Don Wong
*Assistant Examiner* — Theodore Hebert
(74) *Attorney, Agent, or Firm* — Law Office of Jim Boice (57) ABSTRACT

Software is traced using Extensible Markup Language (XML) messages. A trace command, which includes one or more specified fields to be traced and a trace output file location, is defined. A determination is made as to whether the trace command is for a full trace or a differential trace, where the full trace traces all the one or more specified fields, and the differential trace traces specified fields only in response to the specified fields having a value that has changed during processing. The trace command is added to an XML input message for propagation through one or more products. Trace data is collected from the full trace or the differential trace for defined fields at each product, and then stored at the trace output file location.

16 Claims, 4 Drawing Sheets

(56) References Cited

U.S. PATENT DOCUMENTS

| | | | |
|---|---|---|---|
| 7,283,619 | B2 | 10/2007 | Ethier et al. |
| 7,725,606 | B2 | 5/2010 | Lev-Ami et al. |
| 8,214,807 | B2* | 7/2012 | Bestgen .............. G06F 11/3636 717/124 |
| 2001/0034597 | A1 | 10/2001 | Swoboda et al. |
| 2004/0102952 | A1 | 5/2004 | Agarwala et al. |
| 2004/0210877 | A1* | 10/2004 | Sluiman ................. H04L 67/22 717/130 |
| 2006/0041865 | A1 | 2/2006 | Narayana et al. |
| 2006/0259898 | A1* | 11/2006 | Reinhardt ........... G06F 17/2247 717/124 |
| 2008/0209267 | A1 | 8/2008 | Xu et al. |
| 2009/0083325 | A1 | 3/2009 | Belide et al. |
| 2011/0145656 | A1* | 6/2011 | Baitinger ............ G06F 11/3495 714/45 |
| 2015/0212925 | A1* | 7/2015 | Granshaw ............... G06F 9/546 717/128 |

OTHER PUBLICATIONS

Tracelog, Example 4: Updating a Trace Session, Microsoft (Sep. 7, 2011), retrieved from https://msdn.microsoft.com/en-us/library/windows/hardware/ff545872(v=vs.85).aspx on Apr. 19, 2015.*

Marie-Christine Fauvet et al, "Collecting and Querying Distributed Traces of Composite Service Executions", Springer, Lecture Notes in Computer Science, 2002, vol. 2519, pp. 373-390.

Geetika T. Lakshmanan et al., "A Business Centric End-to-End Monitoring Approach for Service Composites", IEEE, International Conference on Services Computing, 2010, pp. 409-416.

M. Ranganathan et al., "Testing Sip Call Flows Using XML Protocol Templates", Springer, Proceedings of the 15th IFIP International Conference on Testing of Communications Systems, 2003, pp. 33-48.

Jonathan I. Maletic et al., "An XML Based Approach to Support the Evolution of Model-to-Model Traceability Links", ACM, TEFSE '05 Proceedings of the 3rd international workshop on Traceability in emerging forms of software engineering, 2005, pp. 67-72.

* cited by examiner

SOFTWARE TRACING USING EXTENSIBLE MARKUP LANGUAGE MESSAGES

BACKGROUND

This invention relates to the field of software tracing. In particular, the invention relates to software tracing using Extensible Markup Language (XML) messages.

Software tracing is commonly used in computer systems during performance monitoring or fault diagnosis processes and logs information about a program's execution. This information is typically used for performance improvement and debugging purposes and diagnosis of problems. However, software tracing may also be a useful tool in data gathering.

Tracing the flow of messages through a system is a well-established and very useful technique for understanding and debugging software. However, tracing generally suffers from the following issues.

There are many different approaches for tracing, so users have to learn a different trace methodology for each product they are using.

End to end testing may span several products, which means tracing has to be engaged and later disengaged in several products.

Each product may write its own trace data in different formats and locations. This makes it difficult to understand and interpret tracing from end-to-end tests spanning several products.

Large quantities of trace data may also be generated, making it difficult to manage and interpret.

Therefore, there is a need in the art to address the aforementioned problems.

SUMMARY

In an embodiment of the present invention, a method and/or computer program product traces software using Extensible Markup Language (XML) messages. A trace command, which includes one or more specified fields to be traced and a trace output file location, is defined. A determination is made as to whether the trace command is for a full trace or a differential trace, where the full trace traces all the one or more specified fields, and the differential trace traces specified fields only in response to the specified fields having a value that has changed during processing. The trace command is added to an XML input message for propagation through one or more products. Trace data is collected from the full trace or the differential trace for defined fields at each product, and then stored at the trace output file location.

In an embodiment of the present invention, a system for software tracing using Extensible Markup Language (XML) messages through one or more products comprises a parameter input hardware component and a trace command hardware component. The parameter input hardware component defines a trace command, which includes one or more specified fields to be traced, a trace output file location, and an indicator of whether the trace is a full trace or a differential trace in which only specified fields that have a value that has changed are traced. The trace command hardware component inputs the trace command into an XML input message for propagation through one or more products, where each product collects the full or differential trace data for defined fields at each product and stores the full or differential trace data to the trace output file location.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for software tracing using added trace commands in XML messages to identify the fields to be traced and the destination of the trace data.

A method of selective, differential end to end tracing through a system using XML tags or strings is described. Differential tracing enables the tracing of only specified message fields and only when they change. This provides a useful and flexible technique for understanding and debugging software.

The described method requires a simple modification to the customer's XML message, which is an artifact they own and understand. The tracing may be carried out for testing and debugging purposes, for performance related analysis, or for data gathering due to the flexible and selective information that can be traced.

Extensible Markup Language (XML) is a markup language that defines a set of rules for encoding documents in a format that is both human-readable and machine-readable. It is defined in the XML 1.0 Specification produced by the W3C, and several other related specifications, all free open standards.

Many application programming interfaces (APIs) have been developed to aid software developers with processing XML data, and several schema systems exist to aid in the definition of XML-based languages.

A "tag" is a markup construct that begins with < and ends with >. An "element" is a logical document component which either begins with a start-tag and ends with a matching end-tag or consists only of an empty element tag.

In one embodiment, this may be achieved by adding a trace tag to an XML input message. The trace tag may be an optional element tag in the XML schema. In a second embodiment, trace strings may be defined at the element level in an XML input message. This would eliminate the need to search for the "trace_tag" element.

The trace command in the form of trace tags or strings may be added to an XML input message statically if this is a test message, or dynamically by manipulating the incoming message.

For the static case, an existing test message may be edited manually or a new test message may be generated with the required trace elements. This static test message would then be sent into the processing system to obtain the required trace data.

In the dynamic case, an intermediary system may take incoming messages and automatically add the chosen trace fields before sending them on. In this way it dynamically adds fields to the message.

In a test system, the trace command may be added to every input message or a random selection of messages, to ensure the system is working as expected. In a production system, the trace command may be added to a selection of messages to test a specific path without affecting the performance of the overall system.

In the first embodiment in which the trace command is provided as a trace tag in an XML message, the tag may include:

The trace data may have the following requirements:
a) Track three fields: CustomerID, CustomerName and PurchaseAmount;
b) Write all the trace data to a test file called trace.txt which is located on D: drive;
c) Only write the selected fields when the value of the field changes during processing;
d) Only a minimal amount of information needs to be written to the trace file i.e. the values of the fields. No additional information or stack traces are required.

Using the first embodiment of the described method, the following trace tag is added to the XML message:

```
<trace_tag>
  <traceFields type="String">CustomerID,CustomerName,PurchaseAmount</traceFields>
    <traceLocation type="String">D:\trace.txt</traceLocation>
    <traceType type="String">Differential</traceType>
    <traceDetail type="String">info</traceDetail>
</trace_tag>
```

A list of the fields to be traced. In the absence of this entry, all message fields will be traced.

The location of the trace output file. This enables all products to write to the same location e.g. text file. If this tag is missing, the product's default trace mechanism may be used.

Type of tracing (full or differential). Full trace will trace all the specified fields. Differential trace will trace the specified fields only when the value changes during processing.

Detail level of trace (for example: info, verbose). Info would only trace the value of the field. Verbose may include more verbose trace information e.g. name of the module running at the point the field was changed, or stack traces.

In the second embodiment in which the trace command is provided as a trace string at element level in an XML message, the string may be provided at a field element to be traced and may include:

The location of the trace output file. This enables all products to write to the same location e.g. text file. If this string is missing, the product's default trace mechanism may be used.

Type of tracing (full or differential). Full trace will trace all the specified fields. Differential trace will trace the specified fields only when the value changes during processing.

Detail level of trace (for example: info, verbose). Info would only trace the value of the field. Verbose may include more verbose trace information e.g. name of the module running at the point the field was changed, or stack traces.

As an example, the following XML message is being sent to an end-to-end processing system:

```
<CustomerID type="String">AB1143265</CustomerID>
<CustomerName type="String">John Smith</CustomerID>
<PurchaseAmount type="Real">455</PurchaseAmount>
<ItemPurchased type="String">50 inch Plasma Television</ItemPurchased>
<PurchaseDate type="String">2/2/12</PurchaseDate>
<Vendor type="String">Electronic World</Vendor>
```

Using the second embodiment of the described method, the following trace string (shown underlined) may be added at an element level. This string is added at the "CustomerID" element:

```
<CustomerID type="String" traceLocation="D:\trace.txt" traceType="Differential" traceDetail="info">AB1143265</CustomerID>
    <CustomerName type="String" traceLocation="D:\trace.txt" traceType="Differential" traceDetail="info">John Smith</CustomerID>
    <PurchaseAmount type="Real" traceLocation="D:\trace.txt" traceType="Differential" traceDetail="info">455</PurchaseAmount>
    <ItemPurchased type="String">50 inch Plasma Television</ItemPurchased>
    <PurchaseDate type="String">2/2/12</PurchaseDate>
    <Vendor type="String">Electronic World</Vendor>
```

Figure 1:
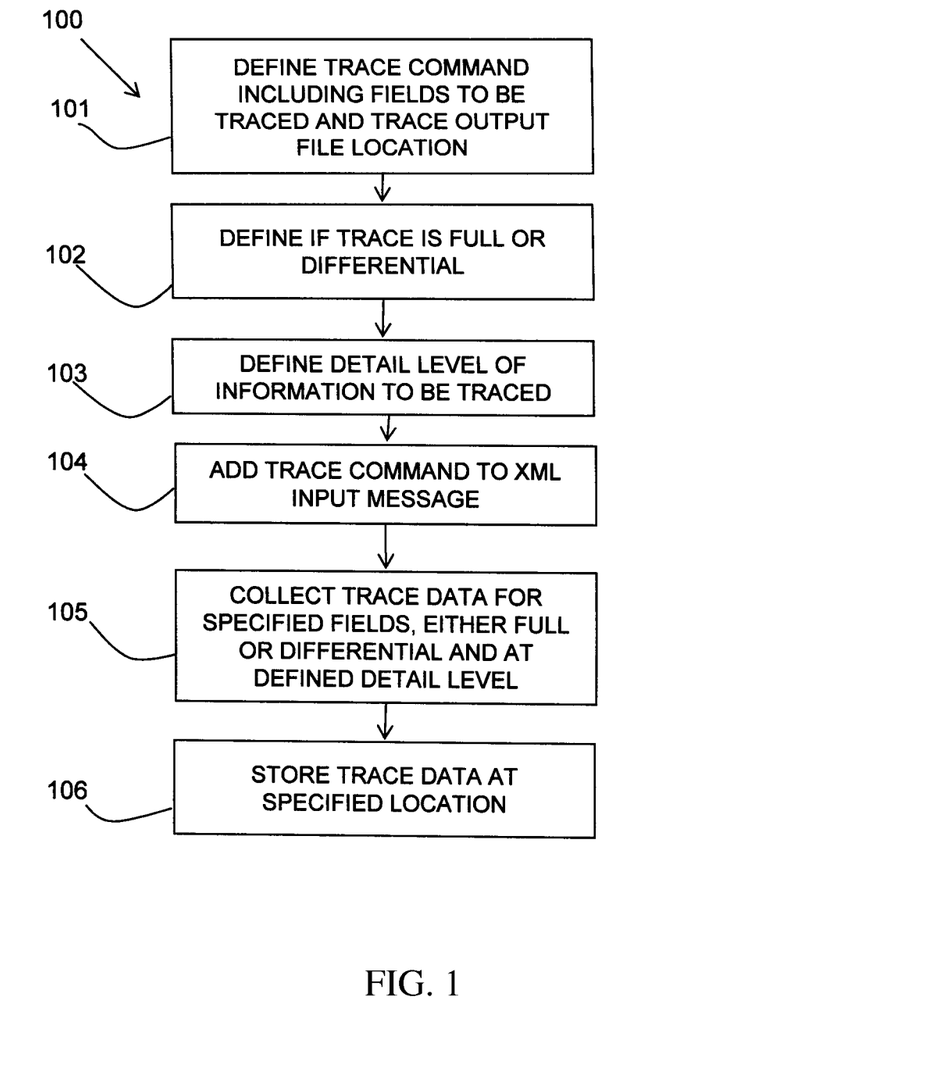
FIG. 1 is a flow diagram of an example embodiment of a method in accordance with the present invention.

Referring to FIG. 1, a flow diagram 100 shows an example embodiment of an aspect of the described method.

A trace command may be defined 101 according to requirements of the trace needed. This may be defined by a software tester or administrator.

In a test system, the trace command may be added to every input message or a selection of messages (for example, a random selection). In a production system, the trace command may be added to a selection of messages to test a specific path.

A trace command may be defined 101 including an indication of the fields to be traced and a trace output file location for the trace data.

In one embodiment, the trace command may be provided in the form of a trace tag for an XML input message with the tag having a list of one or more fields to be traced and the location of the trace output file.

In another embodiment, the trace command may be provided as a trace string at element level in the XML input message in which case the string is inserted into the element of the field of interest and the trace string includes the location of the trace output file. If multiple fields are to be traced, then the trace string is inserted into multiple elements of the XML input message.

If no trace output file location is provided in the trace command, a default location may be used.

The trace command may also define 102 if the trace is to be a full trace or a differential trace. This is referred to as the type of trace. In a full trace, all specified fields will be traced, whereas in a differential trace only the specified fields where values have changed during processing are traced.

The values may be changed by the processing system, for example, the message may contain an element showing the cost to charge a consumer for a product. The processing system may determine that the customer is entitled to a 10% discount and therefore reduce the cost element by 10% before sending the bill to the customer. This "cost" element of the message has therefore changed and would be recorded by differential trace.

The trace command may also define 103 the detail level of the information to be traced. For example, different levels of detail may be defined from a basic minimum amount of information where only the value of the field is recorded, through to more detailed information.

The further definitions of the type of tracing and detail level may also be specified either in the trace tag or in the trace string to be inserted into a message element.

The defined trace command may be added 104 to an XML input message. As mentioned, this may be as a trace tag or as a trace string to be added into an element of the XML input message.

The trace command may be added to an XML input message statically if this is a test message, or dynamically by manipulating the incoming message. This may be carried out at a customer's initial XML generation software, or by any software vendor as part of a debug setting.

The trace data may be collected 105 as the message is propagated through one or more products. Each product may recognize the trace command and write out or store 106 the trace data to the specified location.

Each product may also have a 'trace aware' Boolean flag that may be used to switch off the tracing feature, and therefore remove the overhead of processing and acting upon the trace commands. Most products have an administration console or tooling that is used to configure the product. A "trace aware" check box or flag may be added to the administration pages in the console/tooling that deal with trace. All other aspects of tracing would be controlled by the incoming XML trace commands, providing great control and flexibility.

The current invention allows the modifications to occur at any stage in process. The additional fields could be added and removed by a product as required.

Figure 2:
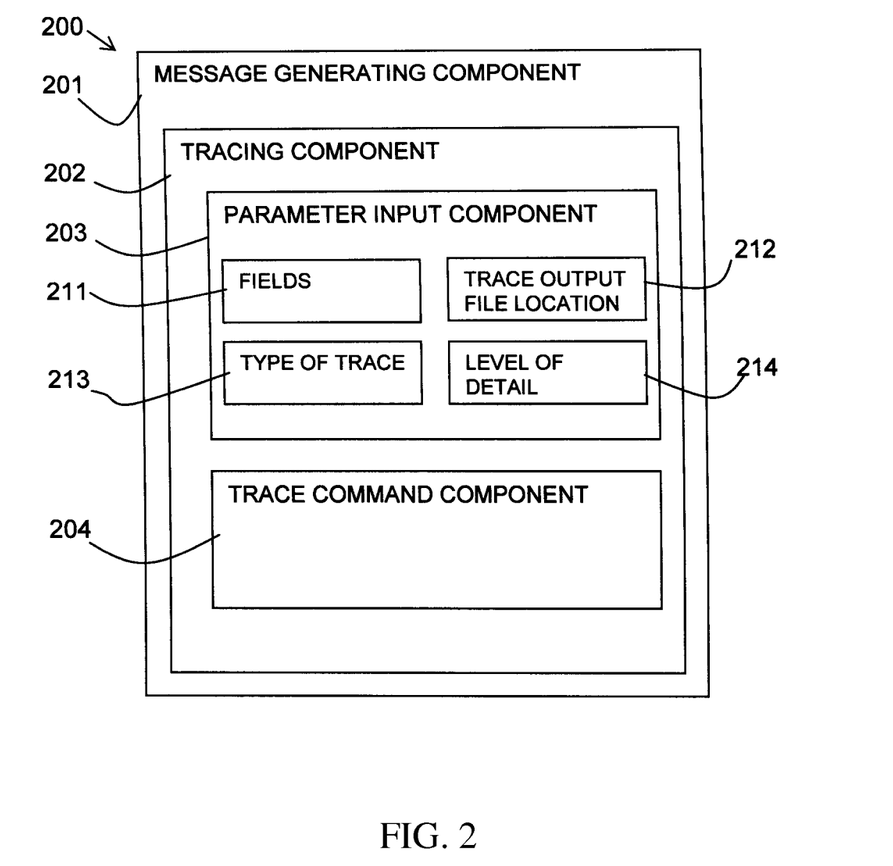
FIG. 2 is block diagram of an example embodiment of a system in accordance with the present invention.

Referring to FIG. 2, a block diagram shows an example of the described system 200.

A message generating component 201 may be provided in the form of debugging or performance testing software, or XML generation software or other forms of software which includes functionality to generate or amend XML messages for input into one or more products. The message generating component 201 may include a tracing component 202 for defining trace commands in XML message.

The tracing component 202 may include a parameter input component 203 for enabling a user to define one or more of: the fields 211 to be traced, a trace output file location 212, a type of trace 213 for each field (i.e. full trace or differential trace), and a level of detail 214 of the trace.

The tracing component 202 may include a trace command component 204 for creating and adding a trace command to an XML message. In one embodiment, the trace command component 204 may generate a trace tag with the defined parameters. In another embodiment, the trace command component 204 may insert a trace string at an element level of an XML message.

Figure 3:
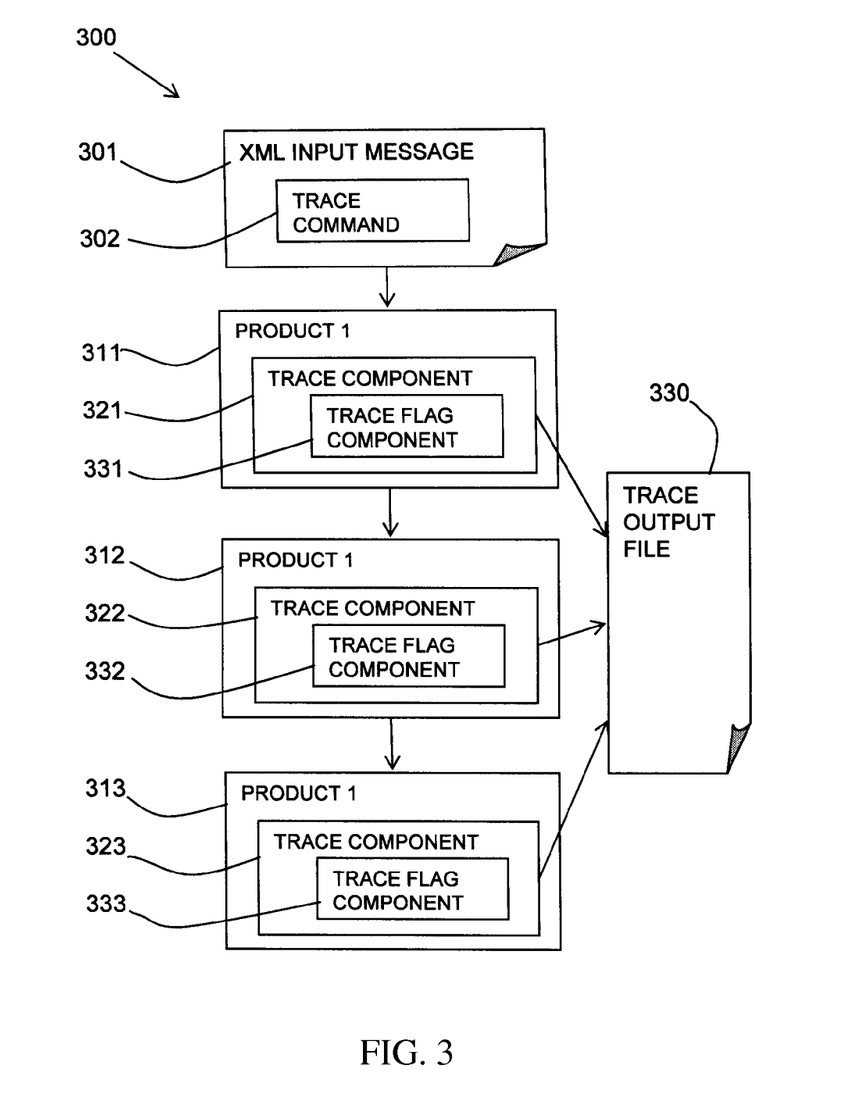
FIG. 3 is a schematic diagram of a message trace in accordance with the present invention.

Referring to FIG. 3, a schematic diagram 300 shows the propagation of a message with a trace command through multiple products.

An XML input message 301 may be provided including a trace command 302 defined in the XML input message 301.

The XML input message 301 may be propagated through one or more products 311-313. Each product 311-313 may include a trace component 321-323 providing functionality for interpreting the trace command and writing out the trace data to the trace output file 330.

The trace component 321-323 of the products 311-313 may include a trace flag component 331-333 for enabling or disabling the trace functionality.

The described method and system only require a modification to the input message. For example, in testing it would be possible to send in a series of test messages, each of which trace an entirely different set of fields, write the output to different locations and provide trace across different products from different vendors. This is a natural way to test the product, without the need to run additional commands or configure external defaults files.

The described method and system also introduce the concept of differential trace which is extremely useful for monitoring a production system. Thousands of messages may be processed but only a few may result in a change in the particular fields that the customer is currently interested in monitoring. Differential trace makes this type of trace viable without large trace files being produced.

In addition the differential (or full trace) may be turned on for specific fields in the input message.

To illustrate the value of the described method and system an example case is considered where a company wishes to offer a free £20 voucher under certain conditions. For example, the conditions may be that the customer is viewing its website but has not purchased anything in the last 90 days and has visited the web site three times this month and the customer's account balance is more than £100. There may be many other conditions that also result in a discount. The company wants to keep track of the processing to make sure that it can verify why customers are receiving a discount during the test phase of the software.

In conventional tracing methods, each system would trace its message data and processing using its own trace mechanism and trace location. To view the logs an administrator would have to open several log files on different systems and search through all the traced message fields in each set of server logs.

In the described method and system, differential trace may be set for the "purchases in last 90 days", "account balance" and "discount given". All three fields would be traced if they changed. So many 'uninteresting' messages coming into the system would not generate trace thus saving a lot of unnecessary tracing. In addition, the location of the trace may be specified, so all the trace from every system involved in the processing would be returned to a single location.

It is therefore easy for the company to view the single log file which will only contain relevant trace data for customers that received a discount.

In a similar way the company could change the fields it is viewing to test other combinations—in each case only viewing relevant data from messages that change the variables of interest, all in a single location.

The described method and system significantly reduce the amount of irrelevant trace and offer the ability to target given test paths for analysis, whilst removing irrelevant and uninteresting data from the trace. It also co-locates all trace data for easy cross system trace and analysis.

As trace data may be gathered from a production system by simply sending in a special trace message (without any system changes or server restarts) this provides a very valuable service to organizations trying to debug production time issues.

Figure 4:
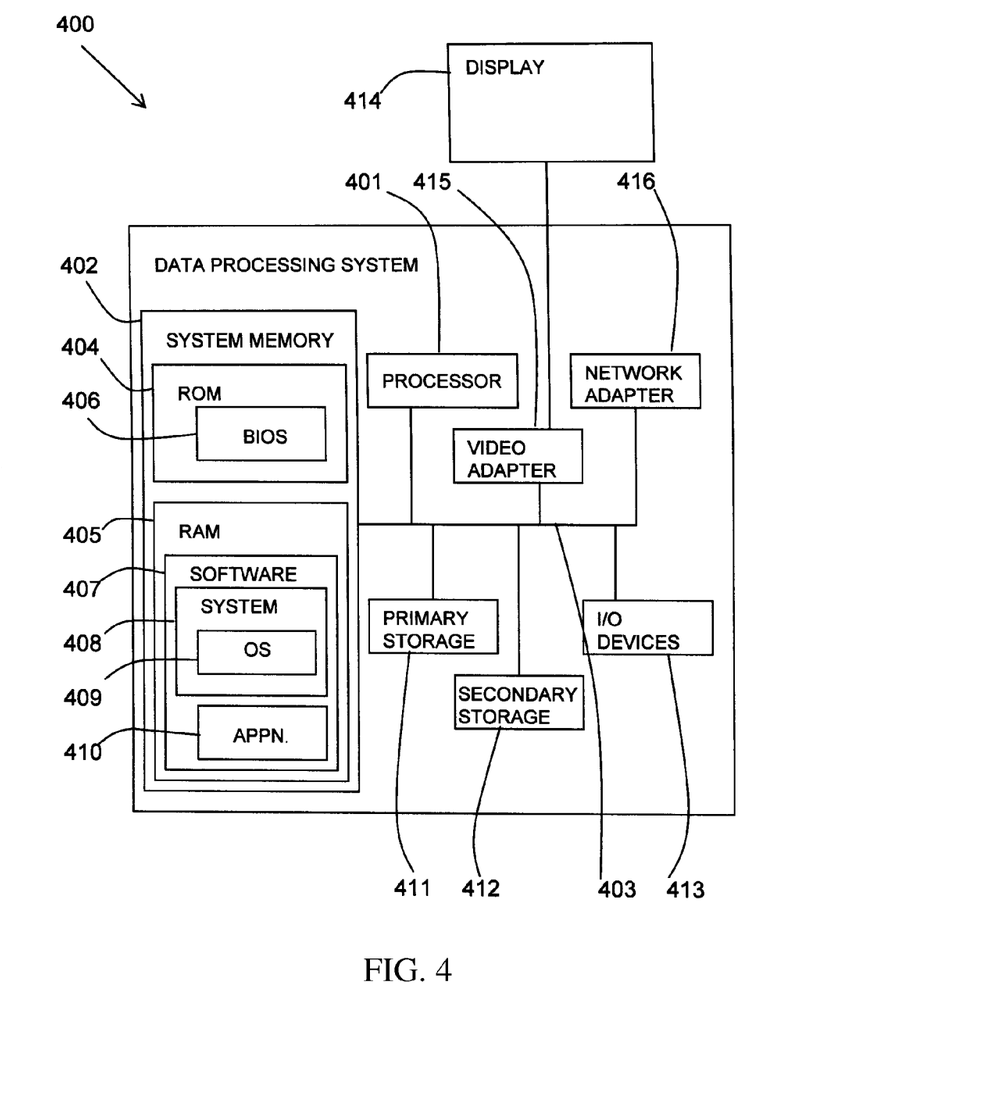
FIG. 4 is a block diagram of an embodiment of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. Software 407 may be stored in RAM 405 including system software 408, including operating system software 409. Software 407 may also include software applications 410 stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Referring back to the limitations of conventional tracing listed in the background section, the described method and system solves the listed problems as follows.

This method may be adopted as a standard, which would avoid the need for customers to learn proprietary trace for every product they own.

As the trace specification is attached to the message, it can be naturally propagated across different systems. This simplifies trace for end to end testing across different products.

The location to write the trace is also specified, so all trace data is located in a single location (e.g. local or shared network drive).

The amount of trace data is reduced, whilst still delivering the key trace data. The trace data can be significantly reduced in three ways:

a) It is possible to specify, and therefore limit, the trace fields of interest. Fields that are uninteresting for a particular test can be excluded. The trace file is therefore significantly smaller and easier to interpret.

b) Differential trace can be specified, which means that fields are only recorded when they are changed. This significantly reduces the amount of trace, whist capturing the key changes in message data.

c) A production system or test system running under heavy load does not need to trace all messages. A selection of incoming messages can have the trace fields added. This produces virtually no overhead to the production/test system but still produces informative trace data for a selection of incoming data. Equally all fields can be traced if required.

According to a first aspect of the present invention there is provided a method for software tracing using Extensible Markup Language (XML) messages, comprising: defining a trace command including one or more specified fields to be traced and a trace output file location; defining in the trace command if the trace is a full trace or a differential trace in which only specified fields that have a value that has changed are traced; adding the trace command to an XML input message for propagation through one or more products; collecting the defined full or differential trace data for the defined fields at each product and storing to the trace output file location.

In one embodiment, the trace command is a trace tag and adding the trace command to an XML input message adds a trace tag to the message. In another embodiment, the trace command is a trace string at an element level and adding the trace command to an XML input message adds the trace string to an element.

The method may include defining in the trace command a level of detail of data to be recorded for a field.

Adding the trace command to an XML input message for propagation through one or more products may include adding the trace command to a selection of messages.

Adding the trace command to an XML input message for propagation through one or more products may further include adding the trace command statically to a test message. Alternatively, adding the trace command to an XML input message for propagation through one or more products may include adding the trace command dynamically to an existing input message.

A product may interpret a trace command and write the specified field values to the defined trace output file location. A product may selectively enable or disable a trace functionality.

According to a second aspect of the present invention there is provided a system for software tracing using Extensible Markup Language (XML) messages through one or more products, comprising: a parameter input component for defining a trace command including one or more specified fields to be traced, a trace output file location, and an indicator of if the trace is a full trace or a differential trace in which only specified fields that have a value that has changed are traced; a trace command component for inputting the trace command to an XML input message for propagation through one or more products; each product collecting the defined full or differential trace data for the defined fields at each product and storing to the trace output file location.

In one embodiment, the trace command may be a trace tag and adding the trace command to an XML input message may add a trace tag to the message.

In another embodiment, the trace command may be a trace string at an element level and adding the trace command to an XML input message may add the trace string to an element.

The parameter input component may also be for defining in the trace command a level of detail of data to be recorded for a field.

The trace command component for adding the trace command to an XML input message for propagation through one or more products may include adding the trace command to a selection of messages. In one embodiment, the trace command component may include adding the trace command statically to a test message. In another embodiment, the trace command component may include adding the trace command dynamically to an existing input message.

A product may include a trace component for interpreting a trace command and writing the specified field values to the defined trace output file location. A product may further include a trace component having a trace flag component for selectively enabling or disabling a trace functionality.

According to a third aspect of the present invention there is provided a computer program product for software tracing using Extensible Markup Language (XML) messages, the computer program product comprising: a computer readable storage medium readable by a processing circuit and storing instructions for execution by the processing circuit for performing a method according to the first aspect of the present invention.

According to a fourth aspect of the present invention there is provided a computer program stored on a computer readable medium and loadable into the internal memory of a digital computer, comprising software code portions, when said program is run on a computer, for performing the method of the first aspect of the present invention.

According to a fifth aspect of the present invention there is provided a method substantially as described with reference to the figures.

According to a sixth aspect of the present invention there is provided a system substantially as described with reference to the figures.

The described aspects of the invention provide the advantage of providing a flexible method of tracing data through multiple products using well known constructs and saving the logged trace data to a single location.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for software tracing using Extensible Markup Language (XML) messages, the method comprising:
    defining, by one or more processors, a trace command including one or more specified fields to be traced and a trace output file location;
    determining, by one or more processors, whether the trace command is for a full trace or a differential trace, wherein the full trace traces all the one or more specified fields, and wherein the differential trace traces the one or more specified fields only in response to the one or more specified fields having a value that has changed during processing;
    adding, by one or more processors, the trace command to an XML input message for propagation through one or more products, wherein the trace command is a trace string at an element level, wherein adding the trace command to the XML input message adds the trace string to an element, wherein the element is a logical document component that begins with a start-tag and ends with a matching end-tag, and wherein adding the trace command to the XML input message for propagation through one or more products includes adding the trace command dynamically to an existing input message;
    identifying, from the XML input message, the one or more specified fields to be traced and a destination of trace data collected from the one or more specified fields by the trace command;
    collecting, by one or more processors, trace data from the differential trace for defined fields at each product; and
    storing, by one or more processors, the collected trace data at the trace output file location identified in the XML input message.

2. The method as claimed in claim 1, wherein the trace command comprises a trace tag, and wherein adding the trace command to the XML input message adds the trace tag to the XML input message.

3. The method as claimed in claim 1, further comprising:
    defining, by one or more processors, in the trace command a level of detail of data to be recorded for said one or more specified fields.

4. The method as claimed in claim 1, wherein adding the trace command to an XML input message for propagation through one or more products comprises:
    adding, by one or more processors, the trace command to a selection of XML input messages.

5. The method as claimed in claim 1, wherein adding the trace command to an XML input message for propagation through one or more products includes adding the trace command statically to a test message.

6. The method as claimed in claim 1, wherein a product interprets a trace command and writes specified field values from the one or more specified fields to the defined trace output file location.

7. The method as claimed in claim 1, wherein a product selectively enables or disables a trace functionality.

8. A system for software tracing using Extensible Markup Language (XML) messages through one or more products, comprising:
    a parameter input hardware component for defining a trace command, wherein the trace command includes one or more specified fields to be traced, a trace output file location, and an indicator of whether the trace is for a full trace or a differential trace in which only specified fields that have a value that has changed are traced, wherein the full trace traces all the one or more specified fields, and wherein the differential trace traces the one or more specified fields only in response to the one or more specified fields having a value that has changed during processing; and
    a trace command hardware component for inputting the trace command into an XML input message for propagation through one or more products, and for identifying, from the XML input message, the one or more specified fields to be traced and a destination of trace data collected from the one or more specified fields by the trace command, wherein the trace command is a trace string at an element level, wherein adding the trace command to the XML input message adds the trace string to an element, wherein the element is a logical document component that begins with a start-tag and ends with a matching end-tag, and wherein adding the trace command to the XML input message for propagation through one or more products includes adding the trace command dynamically to an existing input message, wherein each product collects the full or differential trace data for defined fields at each product and stores the full or differential trace data to the trace output file location identified in the XML input message.

9. The system as claimed in claim 8, wherein the trace command comprises a trace string at an element level, and wherein adding the trace command to the XML input message adds the trace string to an element, wherein the element is a logical document component that begins with a start-tag and ends with a matching end-tag.

10. The system as claimed in claim 8, wherein the parameter input hardware component also defines, in the trace command, a level of detail of data to be recorded for a field.

11. The system as claimed in claim 8, wherein the trace command hardware component also adds the trace command to an XML input message for propagation through one or more products by including the trace command to a selection of messages.

12. The system as claimed in claim 8, wherein the trace command hardware component also adds the trace command to an XML input message for propagation through one or more products by adding the trace command statically to a test message.

13. The system as claimed in claim 8, wherein a product includes a trace component for interpreting a trace command and writing specified field values to the defined trace output file location.

14. The system as claimed in claim 8, wherein a product includes a trace component having a trace flag component for selectively enabling or disabling a trace functionality.

15. A computer program product for software tracing using Extensible Markup Language (XML) messages, the computer program product comprising a non-transitory computer readable storage medium having program code embodied therewith, wherein the computer readable storage medium is not a transitory signal per se, and wherein the program code is readable and executable by a processor to perform a method comprising:

defining a trace command including one or more specified fields to be traced and a trace output file location;

determining whether the trace command is for a full trace or a differential trace, wherein the full trace traces all of the one or more specified fields, and wherein the differential trace traces the one or more specified fields only in response to the one or more specified fields having a value that has changed during processing;

adding the trace command to an XML input message for propagation through one or more products, wherein the trace command is a trace string at an element level, wherein adding the trace command to the XML input message adds the trace string to an element, wherein the element is a logical document component that begins with a start-tag and ends with a matching end-tag, and wherein adding the trace command to the XML input message for propagation through one or more products includes adding the trace command dynamically to an existing input message;

identifying, from the XML input message, the one or more specified fields to be traced and a destination of trace data collected from the one or more specified fields by the trace command;

collecting trace data from the full trace or the differential trace for defined fields at each product; and storing the collected trace data at the trace output file location identified in the XML input message.

16. The computer program product of claim 15, wherein the trace command comprises a trace tag, and wherein adding the trace command to the XML input message adds the trace tag to the XML input message.

\* \* \* \* \*